April 16, 1929.                C. MEISSNER ET AL                1,709,362
                              FISH SLICING MACHINE
                        Filed Nov. 28, 1927      2 Sheets-Sheet 1
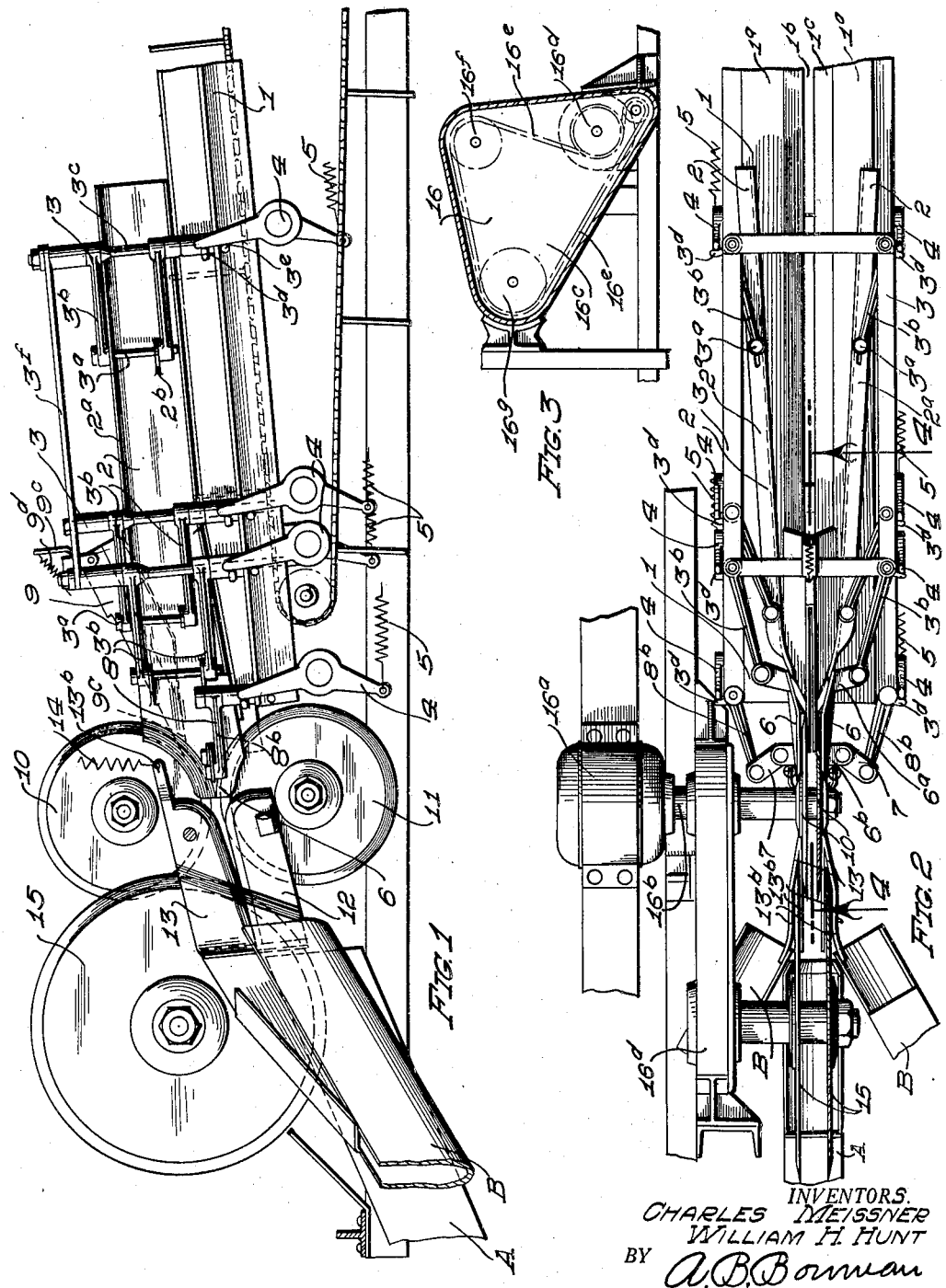
INVENTORS.
CHARLES MEISSNER
WILLIAM H. HUNT
BY A.B.Bowman
ATTORNEY

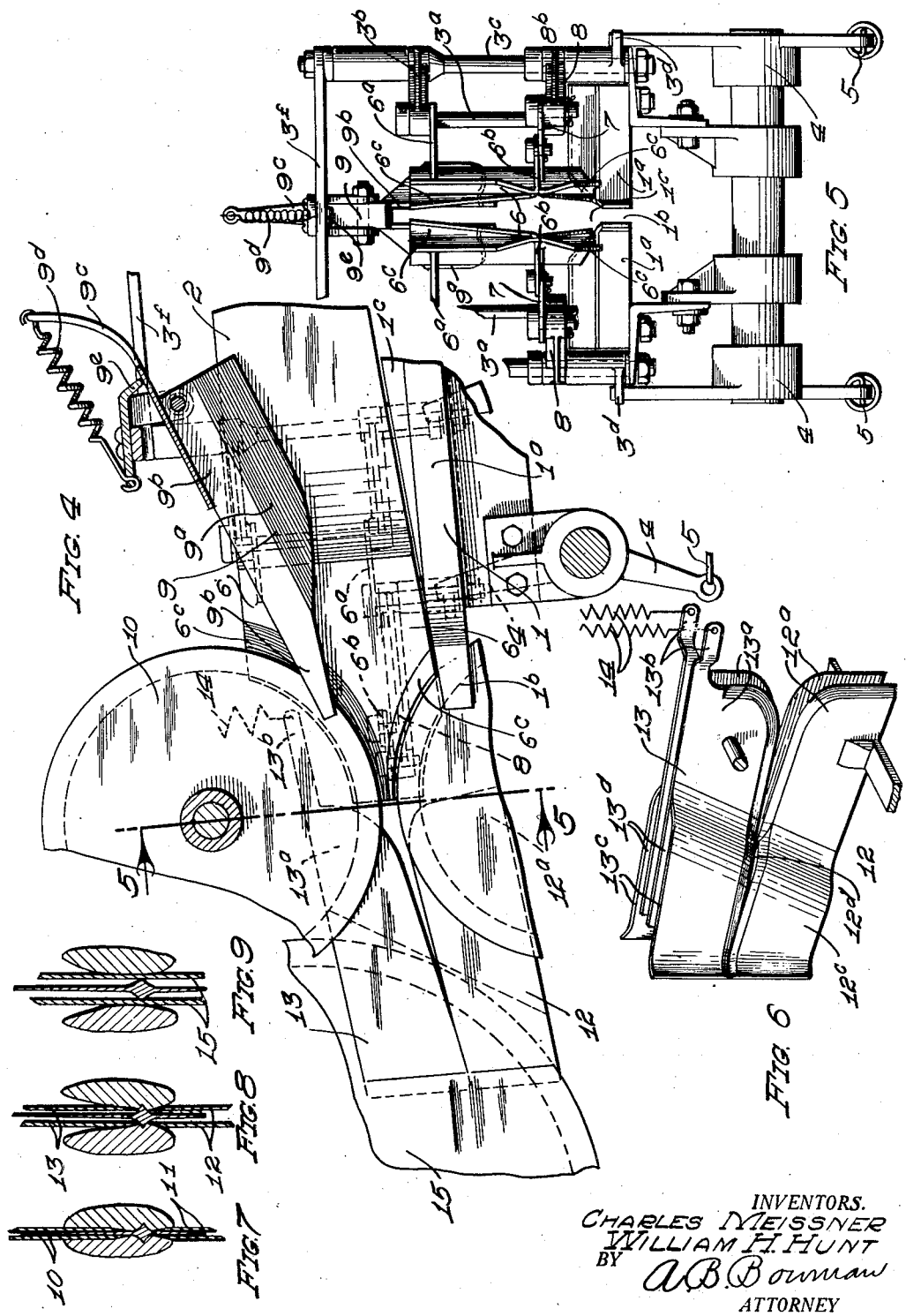

Patented Apr. 16, 1929.

1,709,362

UNITED STATES PATENT OFFICE.

CHARLES MEISSNER, OF SAN DIEGO, AND WILLIAM H. HUNT, OF NATIONAL CITY, CALIFORNIA.

FISH-SLICING MACHINE.

Application filed November 28, 1927. Serial No. 236,037.

Our invention relates to machines for slicing fish and removing the fins, tail, and backbone thereof and the objects of our invention are: first, to provide a machine of this class which performs the operations which formerly required two or more machines, thus a minimum of labor and of floor space is required to slice and remove the backbone, tail and fins of a fish; second, to provide a machine of this class which will make incisions on the upper and the lower sides of the backbone thereof adjacent to the sides of the fins and the tail, which will sever the flesh from the backbone, fins and tail and discharge the flesh into chutes or receivers and the tail, fins and backbone into another chute or receiver; third, to provide a machine of this class in which the edible portions of the fish are separated from the backbone, tail and fins in substantially one continuous operation; fourth, to provide a machine of this class which will slice and remove the backbone, tail and fins from a different size fish without necessitating adjustment of the machine; fifth, to provide a machine of this class in which various sized fish are automatically alined with the cutting means; sizth, to provide a machine of this class which will not clog or jam thus the capacity is limited thereof only to the speed at which the fish are fed into the machine; seventh, to provide a machine of this class which removes a maximum amount of edible portions of the fish from the bones thereof; eighth, to provide a machine of this class in which the fish upon engaging the cutting members is propelled through the machine in one continuous movement; ninth, to provide a machine of this class which may be used either to cut the fish before the head and entrails have been removed or to complete the slicing of the fish after the head and entrails have been removed; tenth, to provide a machine of this class which is provided with automatic guide means which direct the fins and tail between the cutting members and thus prevent portions of the tail and fins from being sliced off with the edible portion; eleventh, to provide on the whole a novelly constructed machine of this class; and twelfth, to provide a machine of this class which is extremely simple and economical of construction, proportional to its function, durable, easily cleaned, easily installed, compact, efficient and which will not readily deteriorate or get out of order.

With these and other objects in view as will appear hereinafter our invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of our machine with supporting frame, feeding guide and receiving chute broken away and in section to facilitate the illustration; Fig. 2 is a plan view thereof from a plane parallel with the feeding guide; Fig. 3 is a fragmentary view of the chain cage showing means for obtaining the desired movement of the cutting blades; Fig. 4 is an enlarged, fragmentary, sectional view through 4—4 of Fig. 2 with parts and portions shown in elevation to facilitate the illustration; Fig. 5 is an enlarged fragmentary elevational view of the fish directing means taken from the line 5—5 of Fig. 4 with the cutting blades removed to facilitate the illustration; Fig. 6 is a perspective view of the deflectors which extend between the two sets of cutting blades with the supporting means shown fragmentarily; Figs. 7, 8 and 9 show three typical steps in the slicing of a fish.

Similar characters of reference refer to similar parts and portions throughout the several views of the drawings.

Feeding guide member 1, preliminary centering guide 2, guide centering mechanism 3, levers 4, spring 5, final centering guide 6, link members 7, guide centering mechanisms 8, tail and fin centering means 9, upper cutting blades 10, lower cutting blades 11, deflecting blades 12 and 13, springs 14, severing blades 15, cutting and severing blade mechanism 16, constitute the principal parts and portions of our fish slicing, backbone, tail and fin removing machine.

The fish are placed on the guiding means 1 and moved therealong with any suitable feeding mechanism, such as a chain with lugs extending therefrom as shown in Fig. 1 of the drawings. The guide member 1 consists of two longitudinally spaced apart portions which are covered on their upper and adjacent sides with metal 1ª. The lower portions of the adjacent metal coverings 1ª are parallel to each other forming a narrow slit 1ᵇ. Their upper adjacent portions form a V-shaped channel 1ᶜ which communicates with the slot 1ᵇ. As the guide member 1 approaches the cutting blade the upper surface is beveled until the V-shaped groove 1ᶜ is entirely cut away. The remaining metal which forms the slot 1ᵇ extends between the blades of the cutting member and is contiguous thereto as shown in Figs. 1 and 4 of the drawings.

A pair of preliminary side centering means 2 are provided which are mounted one on each side of the feeding guide member 1. The centering means 2 are provided with outwardly extending flanges 2ª on their upper side and lugs 2ᵇ near their lower side portions. The rear lugs 2ᵇ and the portion of the flange 2ª thereabove are provided with slots through which extends a pin 3ª to which is movably secured the extended ends of a set of arms 3ᵇ. The arms 3ᵇ are rigidly mounted to a shaft 3ᶜ which is provided with an enlarged lower portion from which extends a lug 3ᵈ. The lever 4 which is actuated by a spring 5 tends to turn the lug 3ᵈ in such a direction that the extended end of the arms 3ᵇ is moved toward the center line of the guide 1. A stop 3ᵉ is provided which limits the movement of said lever 4. A similar centering mechanism 3 is connected to bolts in the lug 2ᵇ and the flange 2ª near the forward end at the side of the preliminary centering means 2. Thus the centering mechanism 3 tends to move the centering means 2 against the sides of the fish. As the force applied on either side of the fish is the same, the fish will be centered in the groove 1ª. The forward end 2ᶜ of the preliminary centering guides 2 is curved inwardly and telescopes within the final side centering guides 6 for a short distance.

The final side centering guides 6 extend on the outer sides and are contiguous to the cutting blades. Each final centering guide 6 is provided near its rear portion with a pair of outwardly extending lugs 6ª to which is pivotally secured the side centering mechanism 3 as previously described. A lug 6ᵇ extends outwardly from the forward portions of each of said final centering guides 6 and is connected by means of a link member 7 to a side centering mechanism 8 which is similar to the side centering mechanism 3 but which is provided with only one arm 8ᵇ on either side. Each final centering guide 6 is provided with a pair of angularly extending projections 6ᶜ the rear portions of which merge into said centering guides 6 in a continuous curve. The extended edges of the projections 6ᶜ extend inward of the inner faces of the cutting blades, follow the peripheries thereof and are adjacent thereto, as shown best in Figs. 4 and 5 of the drawings. Thus the fins and tail of the fish are prevented from passing on the outer sides of the cutting blades. A frame work 3ᶠ holds the several side centering mechanisms in their correct relation and also serves as a support for the tail and fin centering means 9.

The tail and fin centering means 9 operates in conjunction with the centering guide 6 and is provided with a longitudinally extending V-shaped groove 9ª which merges into a comparatively deep narrow parallel faced slot 9ᵇ, as shown best in Figs. 1, 2, 4 and 5 of the drawings. The connecting portions which join the sides of the slot 9ᵇ is cut away at the forward portion of the centering means 9 thereby providing an open slot. The forward portion of the centering means 9 is beveled on its under side thereby completely cutting away the sides of the V-shaped groove 9ª. The material which forms the slot 1ᵇ is contiguous to the cutting blades, as shown in Figs. 1 and 4 of the drawings. The tail and fin centering means 9 is pivotally mounted near its rear portion and is provided with suitable means such as a lug 9ᶜ and spring 9ᵈ which tends to force the extended end downward. A suitable stop means 9ᵉ prevents the centering means from slipping out from between the cutting blades.

The cutting blades consist of two pairs of circular discs, an upper pair 10 and a lower pair 11. The distance between the cutting blades of each set are spaced slightly greater than the width of the fish's tail and fins which members are extremely thin. These cutting blades are driven with approximately the same peripheral speed, and operate so that their adjacent edges rotate away from the feeding guide 1. Thus when the fish engages the cutting blades it is pulled by the friction of the cutting blades from the directing means.

It is preferred to place the fish on its back, tail first. However, by changing the adjustment of the cutting blades the fish may be received belly down or head first. When the fish is delivered tail first, back down, the upper pair of cutting blades 10 straddle the tail and fins and makes a longitudinal double incision along the belly side of the fish almost to the backbone thereof. The lower pair of cutting blades straddle the fins and tail similar to the upper set and makes a double incision along the back side of the fish almost to the backbone thereof. The position of a fish relative to the cutting blades 10 and 11 is shown in Fig. 7 in which a typical cross section of a fish is shown.

Two pairs of deflectors 12 and 13 are provided which are positioned contiguous to the cutting blades 11 and 10, respectively. The adjacent edges of said deflectors are sharpened and form a tapering slit, which extends from the cutting blades 10 and 11 to a pair of severing blades 15. The portions 12ª and 13ª of the deflectors 12 and 13 which are contiguous to the cutting blades 11 and 10 are beveled on their outer edges, thereby facilitating the deflection of the fleshy portions of the fish to the outer sides of the deflectors. The deflectors are supported at their portions 12ª and 13ª, respectively. The deflectors 13 which are pivotally mounted are provided with suitable means such as lugs 13ᵇ and springs 14 which permit the apex of the slit between the deflectors to widen when the unsevered portions of the fish pass between the deflectors. The deflectors 12 and 13 are provided with plates 12ᶜ and 13ᶜ, respectively which are sharpened on their adjacent edges and which merge into said deflectors just rear of the severing blades 15. Thus slots 12ᵈ and 13ᵈ are provided between the plates 12ᶜ and 13ᶜ and their respective deflectors in which travel the severing blades 15. The upper edge of the deflector 12 and the corresponding plate 12ᶜ holds the fish in position for cutting. As the fish passes from the cutting blades 10 and 11 towards the severing blades 15, the adjacent edges of the deflectors scrape the flesh from the sides of the backbone, as shown in Fig. 8 of the drawings. As the fish approaches the edge of the severing blades 15 the plates 12ᶜ and 13ᶜ complete the scraping and the severing blade 15 cuts the remaining bit of flesh which still adheres to the backbone. The flesh portions of the fish are directed into chutes or suitable receptacles A and the bones and tail pass out from between the severing blades into another chute or receptacle B.

The driving mechanism 16 for the various cutting and severing blades comprises a motor 16ª which actuates a shaft 16ᵇ which extends into a housing 16ᶜ and is secured to a sprocket wheel 16ᵈ. A silent chain means 16ᵉ drives other sprockets 16ᶠ and 16ᵍ. The sprockets 16ᵈ, 16ᶠ and 16ᵍ are connected by heavy shafts to the cutting blades 11, 12 and the severing blades 15, respectively.

It will be noted that the preliminary centering means 2, tail and fins centering means 9, may be omitted without greatly reducing the efficiency of the machine. If it is desired, these members may be omitted.

It is obvious from the construction as illustrated in the drawings and described in the foregoing specification, that there is provided a machine in which a fish including its tail and fins is accurately centered relative to the cutting blades, in which the cutting blades partially cut the flesh from the fish, in which the deflecting members scrape the flesh which adheres to the backbone and deflects the fleshy portions out of engagement with the severing blades, and in which the severing blades complete the cleansing of the fish and direct the backbone, fins and tail into a receptacle.

Though we have shown and described a particular construction, combination and arrangement of parts and portions, we do not wish to be limited to this particular construction, combination and arrangement but desire to include in the scope of our invention the construction, combination and arrangement substantially as set forth in the appended claims.

Having thus described our invention, what we claim as new and desire to secure by Letters Patent, is:

1. In a machine of the class described, a guide means, a pair of spaced apart cutting members mounted at the one end of said guide means, a pair of spaced apart cutting means mounted above said cutting members, said cutting members and cutting means adapted to partially sever a fish, and a pair of cutting blades for completing the severing of a fish.

2. In a machine of the class described, a guide means, a pair of spaced apart cutting members mounted at the one end of said guide means, a pair of spaced apart cutting means mounted adjacent to and above said cutting members, said cutting members and cutting means adapted to partially sever a fish, a pair of cutting blades for completing the severing of a fish, a deflector means extending from said cutting member and cutting means to said cutting blades.

3. In a machine of the class described, a guide means, a pair of spaced apart cutting members mounted at the one end of said guide means, a pair of spaced apart cutting means mounted adjacent to and above said cutting members, said cutting members and cutting means adapted to partially sever a fish, a pair of cutting blades for completing the severing of a fish, and automatic centering means mounted at the sides of said guide means and extending to said cutting members and cutting means.

4. In a machine of the class described, a guide means, a pair of spaced apart cutting members mounted at one end of said guide means, a pair of spaced apart cutting means mounted adjacent to and above said cutting members, and automatic centering means mounted at the sides of said guide means and extending to said cutting members and cutting means.

5. In a machine of the class described, a guide means, a pair of spaced apart cutting members mounted at the one end of said guide means, a pair of spaced apart cutting means mounted adjacent to and above said cutting members, said cutting members and cutting means adapted to partially sever a fish, a pair of cutting blades for completing the severing of a fish, a deflector means extending from said cutting members and cutting means to said cutting blades, and automatic centering means mounted at the side of said guide means and extending to said cutting members and cutting means.

6. In a machine of the class described, a guide means, a pair of spaced apart cutting members mounted at the one end of said guide means, a pair of spaced apart cutting means mounted above and adjacent to said cutting members, said cutting members and cutting means adapted to partially sever a fish, and blade and deflector means for completing the severing of a fish.

7. In a machine of the class described, a guide means, a pair of spaced apart cutting members mounted at the one end of said guide means, a pair of spaced apart cutting means mounted above and adjacent to said cutting members, said cutting members and cutting means adapted to partially sever a fish, a pair of cutting blades for completing the severing of a fish, automatic centering means mounted at the sides of said guide means and extending to said cutting members and cutting means, and auxiliary centering means mounted above said guide means and extending between said cutting means.

8. In a machine of the class described, a guide means, a pair of spaced apart cutting members mounted at one end of said guide means, a pair of spaced apart cutting means mounted above and adjacent to said cutting members, automatic centering means mounted at the sides of said first mentioned guide means and extending to said cutting members and cutting means, and auxiliary centering means mounted above said first mentioned guide means and extending between said cutting means.

9. In a machine of the class described, a guide means, a pair of spaced apart cutting members mounted at the one end of said guide means, a pair of spaced apart cutting means mounted above and adjacent to said cutting members, said cutting members and cutting means adapted to partially sever a fish, a pair of cutting blades for completing the severing of a fish, a deflector means extending from said cutting members and cutting means to said cutting blades, automatic centering means mounted at the side of said first mentioned guide means and extending to said cutting members and cutting means, and auxiliary centering means mounted above said guide means and extending between said cutting means.

10. In a machine of the class described, a pair of spaced apart rotatable cutting members, a pair of spaced apart cutting means mounted above, adjacent to and in alinement with said cutting members, a guide member, the one end thereof terminating between said cutting members, centering means mounted at the sides of said guide member and extending past the outer sides of said cutting member and cutting means.

11. In a machine of the class described, a pair of spaced apart rotatable cutting members, a pair of spaced apart cutting means mounted above, adjacent to and in alinement with said cutting members, a guide member, the one end thereof terminating between said cutting members, centering means mounted at the sides of said guide member and extending past the outer sides of said cutting member and cutting means, and an auxiliary centering means pivotally mounted above said first mentioned centering means and extending between the blades of said cutting means.

12. In a machine of the class described, a pair of spaced apart rotatable cutting members, a pair of spaced apart cutting means mounted above, adjacent to and in alinement with said cutting members, a guide member, the one end thereof terminating between said cutting members, centering means mounted at the sides of said guide member and extending past the outer sides of said cutting member and cutting means, an auxiliary centering means pivotally mounted above said first mentioned centering means and extending between the blades of said cutting means, a pair of cutting blades, a pair of deflecting members mounted at the sides of said cutting members, a pair of deflecting members mounted in vertical alinement with said first mentioned deflectors and adjacent to said cutting means, and vertical bifurcations provided in said first and second mentioned deflectors for straddling said cutting blades.

13. In a machine of the class described, a pair of spaced apart rotatable cutting members, a pair of spaced apart cutting means mounted in vertical alinement with said cutting members, a guide member, the one end thereof terminating between said cutting members, centering means mounted at the sides of said guide member and extending past the outer sides of said cutting member and cutting means, a pair of cutting blades, a pair of deflecting members mounted at the sides of said cutting members, a second pair of deflecting members mounted in vertical alinement with said first mentioned deflectors and adjacent to said cutting means, and vertical bifurcations provided in said first and second mentioned deflectors for straddling said cutting blades.

14. In a machine of the class described, a guide means, a pair of spaced apart cutting members mounted at one end of said guide means, a pair of spaced apart cutting means mounted adjacent to and above said cutting members, automatic centering means mounted at the sides of said guide means and extending to said cutting members and cutting means, an auxiliary centering means pivotally mounted above said first mentioned centering means and extending between the blades of said cutting means, a pair of cutting blades, a pair of deflecting members mounted at the sides of said cutting members, a second pair of deflecting members mounted in vertical alinement with said first mentioned deflectors and adjacent to said cutting means, and vertical bifurcations provided in said first and second mentioned deflectors for straddling said cutting blades.

15. In a machine of the class described, a guide means, a pair of spaced apart cutting members mounted at one end of said guide means, a pair of spaced apart cutting means mounted adjacent to and above said cutting members, automatic centering means mounted at the sides of said guide means and extending to said cutting members and cutting means, a pair of deflecting members mounted at the sides of said cutting members, and a second pair of deflecting members mounted in vertical alinement with said first mentioned deflectors and adjacent to said cutting means.

In testimony whereof, we have hereunto set our hands at San Diego, California, this 18th day of November, 1927.

CHARLES MEISSNER.
WILLIAM H. HUNT.